United States Patent
Jeong et al.

(10) Patent No.: US 7,524,441 B2
(45) Date of Patent: Apr. 28, 2009

(54) COLOR FILTER COMPOSITION, METHOD AND APPARATUS FOR MANUFACTURING A COLOR FILTER HAVING THE SAME

(75) Inventors: Sang-Ki Jeong, Cheonan-si (KR); Dong-Uk Choi, Suwon-si (KR); Sung-Ki Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 849 days.

(21) Appl. No.: 10/799,200

(22) Filed: Mar. 12, 2004

(65) Prior Publication Data

US 2004/0206303 A1  Oct. 21, 2004

(30) Foreign Application Priority Data

Apr. 15, 2003 (KR) .................. 10-2003-0023825

(51) Int. Cl.
*C04B 14/00* (2006.01)
*G02B 5/22* (2006.01)
*B01F 3/18* (2006.01)

(52) U.S. Cl. .............. 252/586; 252/582; 106/401; 106/472; 516/33; 516/98; 516/99; 516/100

(58) Field of Classification Search ............. 252/586, 252/582; 516/33, 100, 98, 99; 106/401, 106/472
See application file for complete search history.

(56) References Cited

U.S. PATENT DOCUMENTS

| 3,821,155 A | * | 6/1974 | Kloos ............... 523/171 |
| 5,278,009 A | * | 1/1994 | Iida et al. ............ 430/7 |
| 5,622,794 A | * | 4/1997 | Sato et al. ........... 430/7 |

FOREIGN PATENT DOCUMENTS

| CN | 1409133 | 4/2003 |
| EP | 1298165 | 4/2003 |

* cited by examiner

*Primary Examiner*—Timothy J Kugel
(74) *Attorney, Agent, or Firm*—F. Chau & Associates, LLC.

(57) ABSTRACT

A color filter composition comprises a mixture of a binder and a monomer in a predetermined ratio, a pigment, and a solvent. The predetermined ratio is a ratio of the binder to the monomer and ranges from about 50:50 to about 60:40. The color filter composition further comprises a solid powder having a weight percent in the color filter composition ranging from about 12% to about 18%, wherein the solid powder includes the pigment. The pigment has a weight percent in the solid powder ranging from about 28% to about 38%.

14 Claims, 4 Drawing Sheets

COLOR FILTER COMPOSITION, METHOD AND APPARATUS FOR MANUFACTURING A COLOR FILTER HAVING THE SAME

BACKGROUND OF THE INVENTION

1. Technical Field

The present disclosure relates to a color filter composition, and a method and apparatus for manufacturing a color filter having the color filter composition.

2. Discussion of the Related Art

Devices such as personal and notebook computers, car navigation systems, television sets, etc. may include a liquid crystal display (LCD). The LCD is frequently used because the LCD is lighter and smaller than a display having a cathode-ray tube.

The general structure of an LCD consists of a liquid crystal (LC) layer that is positioned between a pair of panels including field generating electrodes and polarizers. The LC layer is subject to an electric field generated by the electrodes and variations in the field strength change the molecular orientation of the LC layer. For example, upon application of an electric field, the molecules of the LC layer change their orientation and polarize light passing through the LC layer. Appropriately positioned polarized filters block the polarized light, creating dark areas that can represent desired images.

An LCD may include color filters including a red (R) color filter, a green (G) color filter and a blue (B) color filter. Light having a wavelength according to red, green and blue colors may pass through the R, G and B color filters, respectively.

A known color filter composition may include a photo polymerization initiator, a light filtering pigment and a solvent which are spin coated on a substrate to a predetermined thickness to be patterned using a photo process or a photolithography process, thereby forming a conventional color filter. The photo polymerization initiator may be removed using light.

When an LCD apparatus having a large screen size is manufactured using the spin coating process, consumption of components of the color filter and energy is greatly increased and the substrate may be broken by centrifugal force.

A slit coating process also may be used to manufacture an LCD apparatus having the large screen size. In a slit coating process, the color filter composition is discharged through an extended slit to coat a substrate using a slit coater, thereby forming a color filter layer.

However, because the slit is narrow, a portion of the color filter composition may be clogged in the slit or harden in the slit coater. If a portion of the color filter composition adheres to a surface of the slit coater, the color filter layer may be dotted or striped.

SUMMARY OF THE INVENTION

A color filter composition, in accordance with an embodiment of the present invention, comprises a mixture of a binder and a monomer in a predetermined ratio, a pigment, and a solvent.

The predetermined ratio is a ratio of the binder to the monomer and may range from about 50:50 to about 60:40. The pigment may be at least one of a red pigment, a green pigment and a blue pigment. The pigment may include a mixture of a plurality of pigments, each pigment of the plurality of pigments having a different color index. The color filter composition may further comprise a solid powder having a weight percent in the color filter composition ranging from about 12% to about 18%, wherein the solid powder includes the pigment. The pigment may have a weight percent in the solid powder ranging from about 28% to about 38%. A viscosity of the color filter composition may range from about 3.3 mPa·s to about 4.1 mPa·s at about 25° C. The color filter composition may further comprise a black material for forming a black matrix and may be coated on a substrate using a slit coating process.

A color filter composition, in accordance with another embodiment of the present invention, comprises a solvent, and a solid powder having a weight percent in the color filter composition ranging from about 12% to about 18%.

The solid powder may include a pigment having a weight percent in the solid powder ranging from about 28% to about 38%. The color filter composition as may further comprise a binder, and a monomer, wherein a ratio of the binder to the monomer ranges from about 50:50 to about 60:40.

A method of manufacturing a color filter, in accordance with an embodiment of the present invention, comprises forming a color filter composition, wherein the color filter composition includes a solid powder having a weight percent in the color filter composition ranging from about 12% to about 18%, coating the color filter composition on a substrate to form a color filter thin film, and patterning the color filter thin film to form a color filter on the substrate.

The solid powder may include a pigment having a weight percent in the solid powder ranging from about 28% to about 38%. The pigment may be at least one of a red pigment, a green pigment and a blue pigment, and may include a mixture of a plurality of pigments, each pigment of the plurality of pigments having a different color index. The color filter composition may further include a binder, and a monomer, wherein a ratio of the binder to the monomer ranges from about 50:50 to about 60:40. The substrate may remain in a predetermined location while the color filter composition is coated thereon. The color filter composition may be coated on the substrate using a slit coating process. The color filter composition may further include a solvent, the solvent being dried after the color filter composition is coated on the substrate. The color filter thin film may be patterned using at least one of a photo process and a photolithography process. A viscosity of the color filter composition may range from about 3.3 mPa·s to about 4.1 mPa·s at about 25° C. The color filter composition may further include a black material for forming a black matrix.

An apparatus for manufacturing a color filter, in accordance with an embodiment of the present invention, comprises a supply unit for storing a color filter composition, a slit coater for discharging through a slit the color filter composition provided from the supply unit onto a surface of a substrate; and a transfer unit for moving the slit coater over the surface of the substrate while discharging the color filter composition.

The apparatus may further comprise a transfer pipe positioned between the supply unit and the slit coater, wherein the transfer pipe carries the color filter composition from the supply unit to the slit coater, and a bubble removing unit positioned between the supply unit and the slit coater for removing gas bubbles from the color filter composition. The color filter composition may include a solid powder having a weight percent in the color filter composition ranging from about 12% to about 18%. The solid powder may include a pigment having a weight percent in the solid powder ranging from about 28% to about 38%. The color filter composition may also include a binder, and a monomer, wherein a ratio of the binder to the monomer ranges from about 50:50 to about 60:40. The substrate may remain in a predetermined position during discharge of the color filter composition.

A color filter composition, in accordance with another embodiment of the present invention, comprises a binder, a monomer, a dispersant, and at least one of a filling, a surfactant, an adhesion accelerant, an antioxidant, an untraviolet absorbent, and an adhesion initiator.

BRIEF DESCRIPTION OF THE DRAWINGS

Preferred embodiments of the present invention can be understood in more detail from the following descriptions taken in conjunction with the accompanying drawings, in which.

DETAILED DESCRIPTION OF THE PREFERRED EMBODIMENTS

Figure 1:
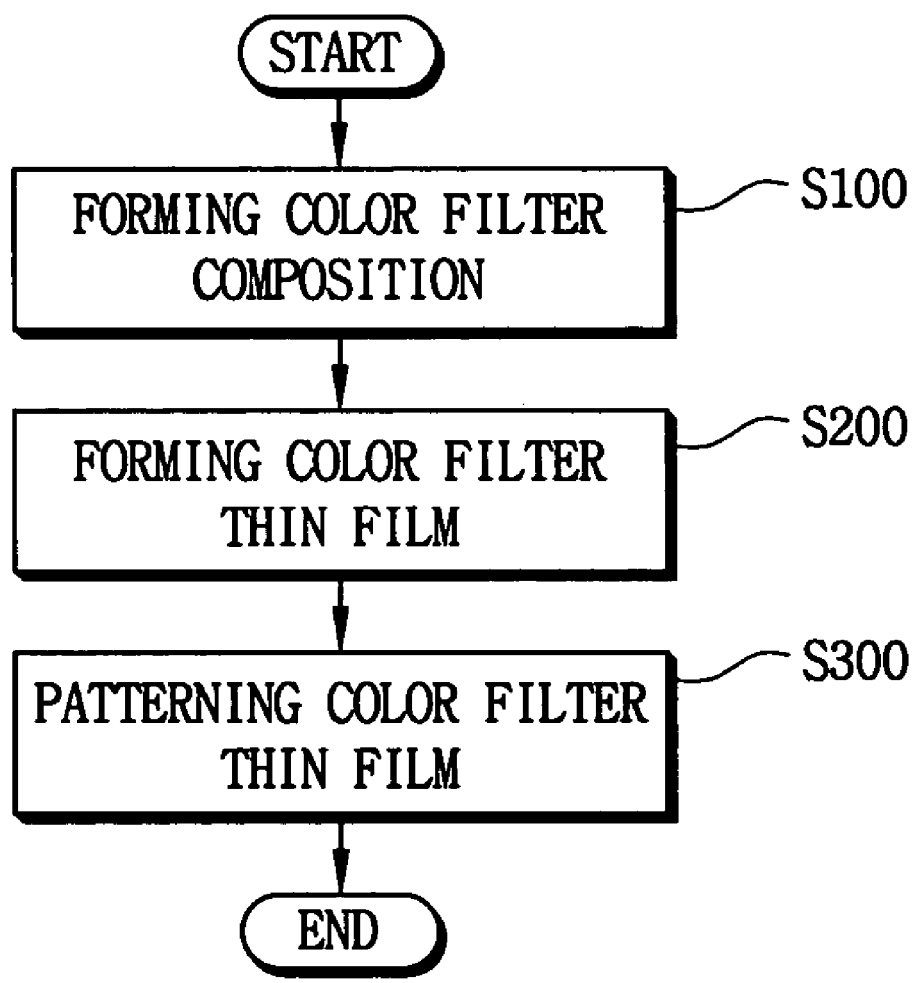
FIG. 1 is a flowchart showing a method of manufacturing a color filter according to an embodiment of the present invention.

Preferred embodiments of the present invention will now be described more fully hereinafter below in more detail with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

A color filter composition, according to an embodiment of the present invention, includes a mixture of a binder and a monomer in a predetermined ratio, a pigment for filtering light having a predetermined wavelength, and a solvent. The pigment may be a red, green or blue pigment. Light having a wavelength according to red, green and blue colors may pass through the red, green and blue pigments, respectively. A plurality of pigments, each pigment having a different color index (CI), may be mixed in a predetermined ratio to form the red, green or blue pigments.

Alternatively, the color filter composition may include a binder, a monomer, a dispersant not including the pigment and the solvent, fillings, a surfactant, an adhesion accelerant, an antioxidant, an ultraviolet absorbent, and an adhesion initiator. Also, the color filter composition may include the binder, the monomer, the pigment, a dispersant, fillings, a surfactant, an adhesion accelerant, an antioxidant, an ultraviolet absorbent, and an adhesion initiator.

The viscosity and fluidity of the color filter composition is increased in proportion to the content of the solvent. The solvent is dried after the color filter composition is coated on the substrate, thereby forming a color filter thin film on the substrate.

The color filter composition according to an embodiment of the present invention includes a solid powder having a weight percent ranging from about 12% to about 18%. The solid powder includes the pigment having a weight percent with respect to the solid powder ranging from about 28% to about 38%. A ratio of the binder to monomer ranges from about 50:50 to about 60:40. When the color filter composition having the above weight percents is coated on the substrate using the slit coating process, the color filter is prevented from being spotted or striped. When the content of the solid powder is lower than 12% by weight, the viscosity of the color filter composition is decreased so that the color filter composition may flow after the color filter composition is coated on the substrate. When the content of the solid powder is more than 18% by weight, the viscosity of the color filter composition is increased so that the color filter composition may adhere to the slit coater, resulting in a spotted or striped color filter thin film. Preferably, the color filter composition includes the solid powder from about 12% to about 15% by weight, and the solid powder includes the pigment from about 28% to about 38% by weight. The ratio of the binder to monomer preferably ranges from 50:50 to about 60:40.

When the content of the solid powder and the solvent is changed, quality of the color filter thin film and the viscosity of the color filter composition may be controlled. Preferably, the viscosity of the color filter composition ranges from about 3.3 mPa·s to about 4.1 mPa·s at a temperature of about 25° C.

Table 1 shows properties of the red color filter composition, Table 2 shows properties of the green color filter composition, and Table 3 shows properties of the blue color filter composition.

PGMEA stands for propylene glycol mono-methyl ether acetate, and EEP stands for ethylene 3-ethoxy propionylate. Materials manufactured by Sumitomo Chemical Co. LTD are represented by symbols AT-3, A-3, R254, Y139, F comp. 150, G36, B15:6, V23, etc. Calibration is represented by the symbol 'ca'.

TABLE 1

| Properties | Unit | Type A | Type B | Type D |
|---|---|---|---|---|
| Viscosity | mPa · s/25° C. | ca 3.9 | ca 4.1 | ca 3.3 |
| Solid Powder Content | wt % | 18 | 18 | 15 |
| Binder/Monomer | wt Ratio | 45/55 | 45/55 | 45/55 |
| Binder Acid Value | A > B > C > D | D | D | D |
| Photo initiator System | | AT-3 | AT-3 | AT-3 |
| Thermosetting Reactant | | non | non | non |
| Pigment Content | Wt % in Solid | ca 28 | ca 33 | ca 33 |
| Pigment | Main./Sub. | R254/Y139 | R254/Y139 | R254/Y139 |
| Dispersant (Red) | | A | A | A |
| Dispersant (Yellow) | | B | B | B |

TABLE 1-continued

| Properties | Unit | Type A | Type B | Type D |
|---|---|---|---|---|
| Solvent (Mixture Ratio) | Wt Ratio | PGMEA/EEP 90/10 | PGMEA/EEP 90/10 | PGMEA/EEP 90/10 |
| Surfactant | ppm for Resist | F comp. 150 | F comp. 150 | F comp. 150 |

TABLE 2

| Properties | Unit | Type A | Type B | Type C | Type D |
|---|---|---|---|---|---|
| Viscosity | Mpa·s/25° C. | ca 4.2 | ca 4.2 | ca 4.2 | ca 3.5 |
| Solid Content | wt % | ca 18 | ca 18 | ca 18 | ca 15 |
| Binder/Monomer | wt Ratio | 52.5/47.5 | 57.5/42.5 | 57.5/42.5 | 57.5/42.5 |
| Binder Acid Value | A > B > C > D | B (Low MW) | A | C | C |
| Photoinitiator System | | A-3 | A-3 | A-3 | A-3 |
| Pigment Content | wt % in Solid | ca 35 | ca 36 | ca 38 | ca 38 |
| Pigment | Main/Sub. | G36/Y150 | G36/Y150 | G36/Y150 | G36/Y150 |
| Dispersant (Green) | | A | D | D | D |
| Dispersant (Yellow) | | B | F | F | F |
| Solvent (Mixture Ratio) | wt Ratio | PGMEA/EEP 70/30 | PGMEA/EEP 70/30 | PGMEA/EEP 70/30 | PGMEA/EEP 70/30 |
| Surfactant | ppm for Resist | Si comp. 250 | Si comp. 250 | Si comp. 250 | Si comp. 250 |

TABLE 3

| Properties | Unit | Type A | Type B | Type C | Type D |
|---|---|---|---|---|---|
| Viscosity | mPa·s/25° C. | 4.3 | 4.0 | 3.7 | 3.2 |
| Solid Content | wt % | 18 | 18 | 18 | 15 |
| Binder/Monomer | wt Ratio | 46/54 | 46/54 | 46/54 | 46/54 |
| Binder Acid Value | A > B > C > D | B | B | B | B |
| Photoinitiator System | | A-2 | A-2 | A-2 | A-2 |
| Pigment Content | wt % in Solid | ca 27 | ca 25 | ca 32 | ca 32 |
| Pigment | Main/Sub. | B15:6/V23 | B15:6/V23 | B15:6/V23 | B15:6/V23 |
| Dispersant (Blue) | | A | B | A | A |
| Dispersant (Violet) | | A | B | A | A |
| Solvent (Mixture Ratio) | wt Ratio | PGMEA/EEP 60/40 | PGMEA/EEP 60/40 | PGMEA/EEP 60/40 | PGMEA/EEP 60/40 |
| Surfactant | ppm for Resist | F 200 + Si 400 | F 200 + Si 400 | F 200 + Si 400 | F 200 + Si 400 |

FIG. 1 is a flowchart showing a method of manufacturing a color filter according to an embodiment of the present invention.

Referring to FIG. 1, at step 100, a binder, a monomer, a pigment and a solvent are mixed to form a color filter composition (S100).

The color filter composition includes the solid powder having a weight percent from about 12% to about 18%, and the solid powder includes the pigment having a weight percent from about 28% to about 38%. A ratio of the binder to monomer ranges from about 50:50 to about 60:40. Preferably, the color filter composition includes the solid powder ranging from about 12% to about 15% by weight. Preferably, a viscosity of the color filter composition is from about 3.3 mPa·s to about 4.1 mPa·s at a temperature of about 25° C.

At step 200, a color filter thin film is formed on a substrate after the color filter composition is formed (S200). The color filter composition is coated over the substrate to form the color filter thin film. The color filter composition is coated over the substrate from an end portion thereof to another end portion thereof while the substrate remains in a predetermined location. At step 300, the color filter thin film is then patterned using a photo process or a photolithography process after the color filter thin film is formed on the substrate, thereby forming a color filter on the substrate (S300).

Figure 2:
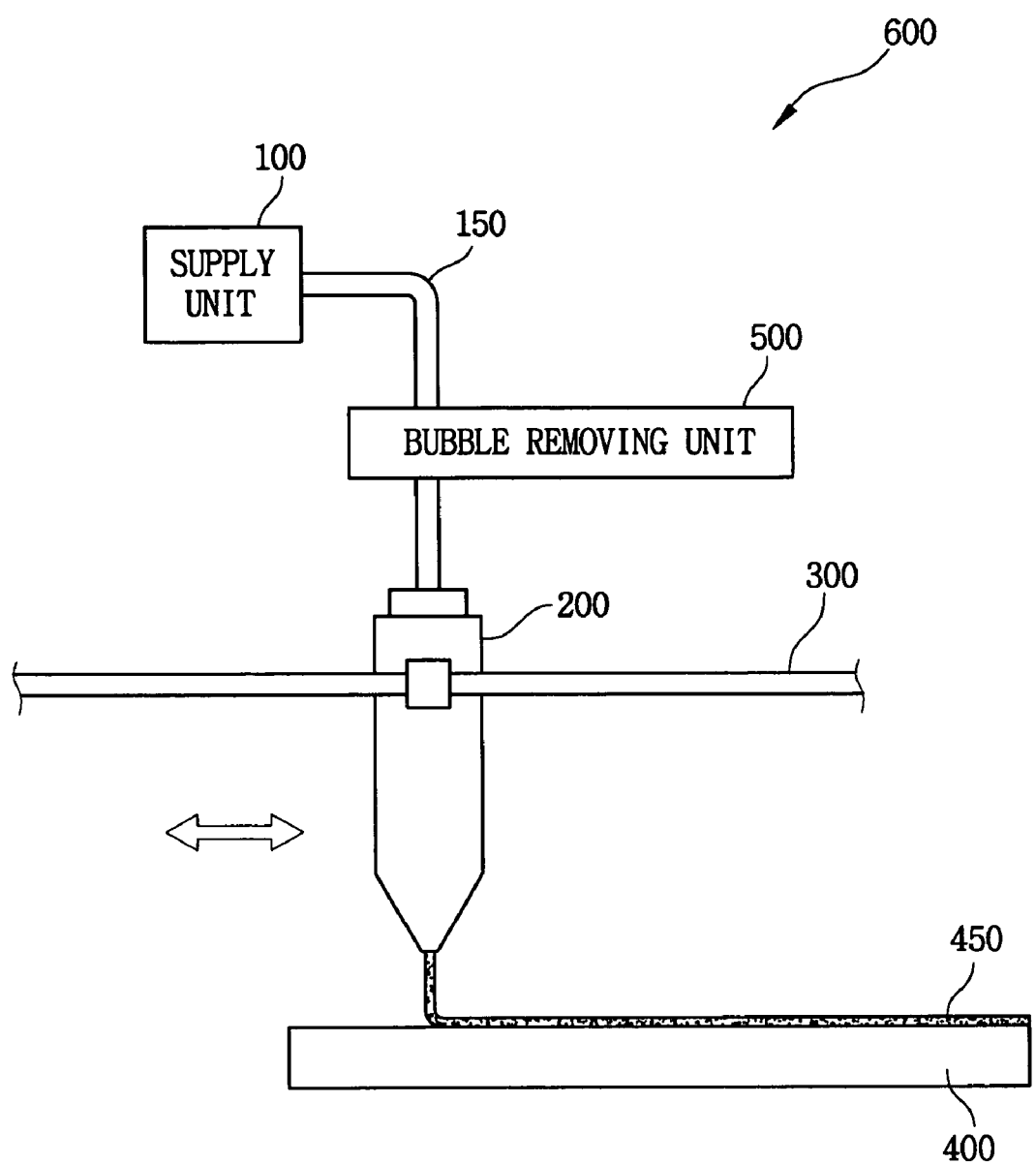
FIG. 2 is a cross-sectional view showing an apparatus for manufacturing a color filter according to an embodiment of the present invention.

FIG. 2 is a cross-sectional view showing an apparatus for manufacturing a color filter according to an embodiment of the present invention.

Referring to FIG. 2, an apparatus 600 for manufacturing the color filter includes a supply unit 100, a slit coater 200 and a transfer unit 300. A color filter composition comprising a solid powder and a solvent is stored in the supply unit 100. The color filter composition stored in the supply unit 100 includes the solid powder having a weight percent ranging from about 12% to about 18%, and the solid powder includes the pigment having a weight percent ranging from about 28% to about 38%. A ratio of the binder to monomer ranges from about 50:50 to about 60:40. Preferably, the color filter composition includes the solid powder ranging from about 12% to about 15% by weight. Preferably, concentration of the solid powder and the solvent is controlled so that a viscosity of the color filter composition stored in the supply unit 100 is from about 3.3 mPa·s to about 4.1 mPa·s at a temperature of about 25° C.

The slit coater 200 discharges the color filter composition provided from the supply unit 100 to a surface of a substrate 400 through an extended slit. The slit coater 200 is connected to the supply unit 100 having a transfer pipe 150 therebetween. The color filter composition discharged from the supply unit 100 is transferred to the slit coater 200 through the transfer pipe 150.

The transfer unit 300 moves the slit coater 200 so that the color filter composition discharged from the slit coater 200 is coated on the substrate 400 to form a color filter thin film 450 thereon, while the substrate 400 remains a predetermined position.

A bubble removing unit 500 for removing gas bubbles from the color filter composition may be disposed between the supply unit 100 and the slit coater 200. The bubble removing unit 500 is disposed on the transfer pipe 150 and includes a bubble removing pipe (not shown). A gas bubble is capable of passing through the bubble removing pipe and the color filter composition does not pass through the bubble removing pipe. The bubble removing pipe is disposed on an inner surface of a decompression chamber, which forms a decompression atmosphere so that a bubble is easily removed from the bubble removing pipe.

Figure 3:
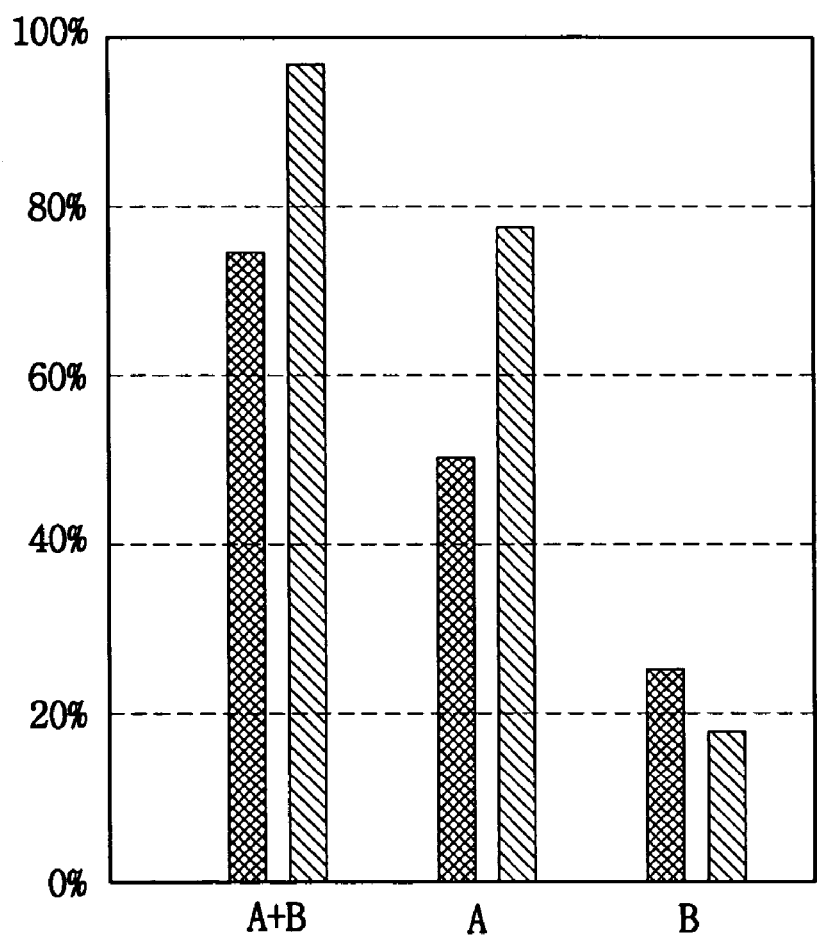
FIG. 3 is a graph showing yield of an apparatus for manufacturing color filters using a conventional color filter composition and yield of an apparatus for manufacturing color filters using a color filter composition according to an embodiment of the present invention.

FIG. 3 is a graph showing yield of an apparatus for manufacturing color filters using a conventional color filter composition and yield of an apparatus for manufacturing color filters using a color filter composition according to an embodiment of the present invention.

Referring to FIG. 3, an LCD apparatus without a defective unit cell is represented by "A", and an LCD apparatus having one defective unit cell is represented by "B". As shown in FIG. 3, the yield of an LCD apparatus without a defective unit cell using the conventional color filter composition was 50%, whereas the yield of an LCD apparatus without a defective unit cell using the color filter composition according to an embodiment of the present invention was 78%. The yield of an LCD apparatus having one defective unit cell using the conventional color filter composition was 25%, and the yield of an LCD apparatus having one defective unit cell using the color filter composition according to an embodiment of the present invention was 19%. Accordingly, the sum of yields of "A" and "B" using the conventional color filter composition was 75%, and using the color filter composition according to an embodiment of the present invention was 97%. Therefore, the yield of the LCD apparatus having no defective unit cell was greatly increased when the color filter composition according to an embodiment of the present invention was used.

Figure 4:
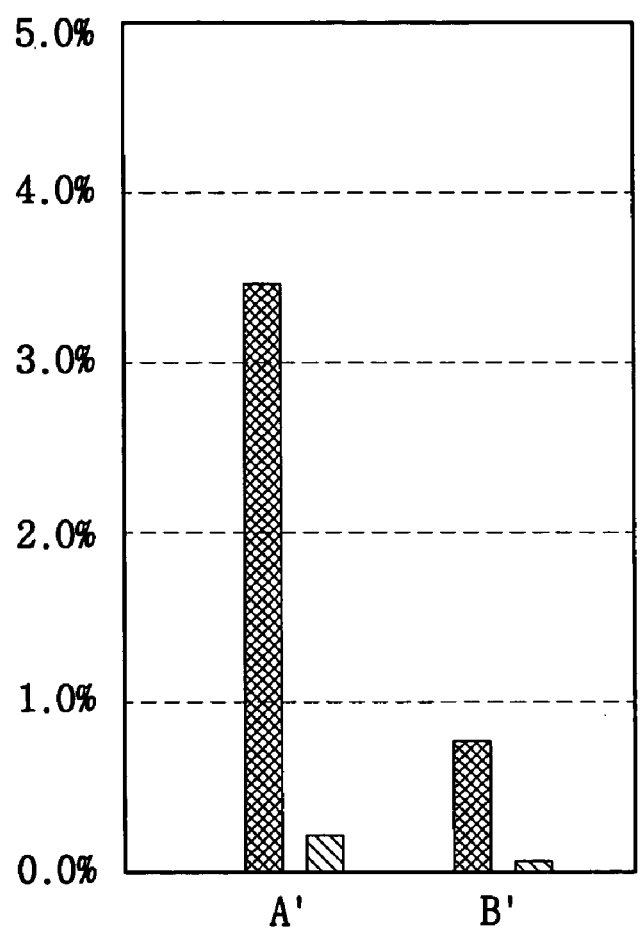
FIG. 4 is a graph showing amounts of defective portions of LCD apparatuses when using a conventional color filter composition and a color filter composition according to an embodiment of the present invention.

FIG. 4 is a graph showing amounts of defective portions of LCD apparatuses when a conventional color filter composition and a color filter composition according to an embodiment of the present invention are used.

An LCD apparatus having a spotted color filter thin film is represented by "A'", and an LCD apparatus having a striped color filter thin film is represented by "B'".

Referring to FIG. 4, the percent of a defective portion of an LCD apparatus having a spotted color filter thin film when using the conventional color filter composition was 3.5%, and that when using the color filter composition according to an embodiment of the present invention was 0.2%. The percent of a defective portion of an LCD apparatus having a striped color filter thin film when using the conventional color filter composition was 0.8%, and that when using the color filter composition according to an embodiment of the present invention was 0.1%.

Therefore, the yield of an LCD apparatus manufactured using the color filter composition according to the an embodiment of the present invention was increased, and the defective portions were decreased.

In an embodiment of the present invention, the pigment may be removed from the color filter composition so that a color filter composition without the pigment may be used as a photoresist material for forming a thin film transistor by the slit coating process. A color filter composition having a black material may also be used to form a black matrix by the slit coating process.

According to an embodiment of the present invention, the content of the solid powder and the solvent of the color filter composition are controlled to prevent a color filter from being spotted or striped during manufacturing of the color filter thin film, thereby increasing yield of the color filter and decreasing defects.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A color filter composition for a display device, comprising:
    a mixture of a binder and a monomer at a predetermined ratio;
    a pigment;
    a solid powder having a weight percent in the color filter composition ranging from about 12% to about 18%; and
    a solvent,
    wherein the color filter composition is capable of being coated over a substrate to form a color filter thin film capable of being patterned using a photo process or a photolithography process.

2. The color filter composition as recited in claim 1, wherein the solid powder includes the pigment.

3. The color filter composition as recited in claim 2, wherein the pigment has a weight percent in the solid powder ranging from about 28% to about 38%.

4. The color filter composition as recited in claim 1, wherein the predetermined ratio is a ratio of the binder to the monomer and ranges from about 50:50 to about 60:40.

5. The color filter composition as recited in claim 1, wherein the pigment is at least one of a red pigment, a green pigment and a blue pigment.

6. The color filter composition as recited in claim 1, wherein the pigment includes a mixture of a plurality of pigments, each pigment of the plurality of pigments having a different color index.

7. The color filter composition as recited in claim 1, wherein a viscosity of the color filter composition ranges from about 3.3 mPa·s to about 4.1 mPa·s at about 25° C.

8. The color filter composition as recited in claim 1, further comprising a black material for forming a black matrix.

9. The color filter composition as recited in claim 1, wherein the color filter composition is coated on a substrate using a slit coating process.

10. A color filter composition for a display device, comprising:
    a solvent;
    a pigment;
    a solid powder having a weight percent in the color filter composition ranging from about 12% to about 18%; and
    wherein the color filter composition is capable of being coated over a substrate to form a color filter thin film capable of being patterned using a photo process or a photolithography process.

11. The color filter composition as recited in claim 10, wherein the pigment has a weight percent in the solid powder ranging from about 28% to about 38%.

12. The color filter composition as recited in claim 11, wherein the pigment is at least one of a red pigment, a green pigment and a blue pigment.

13. The color filter composition as recited in claim 10, further comprising:
- a binder; and
- a monomer, wherein a ratio of the binder to the monomer ranges from about 50:50 to about 60:40.

14. A color filter composition for a display device, comprising:
- a binder;
- a monomer;
- a dispersant;
- a pigment;
- a solid powder having a weight percent in the color filter composition ranging from about 12% to about 18%; and
- at least one of a filing, a surfactant, an adhesion accelerant, an antioxidant, an ultraviolet absorbent, and adhesion initiator, wherein the color filter composition is capable of being coated over a substrate to form a color filter thin film capable of being patterned using a photo process or a photolithography process.

* * * * *